Patented Jan. 23, 1940

2,188,285

UNITED STATES PATENT OFFICE 2,188,285

GOLF BALL COVER

James A. Merrill, Akron, Ohio, assignor to Wingfoot Corporation, Wilmington, Del., a corporation of Delaware No Drawing. Application September 23, 1936, Serial No. 102,220

5 Claims. (Cl. 273—62)

This invention relates to a tough, plastic composition suitable for golf ball covers, etc. It includes the composition and a golf ball which has a cover of such composition.

The composition comprises balata and a chloroprene polymer of the type marketed as "Duprene". It may also include other plastic materials such as resinous or gum-like materials or rubber, etc. Coloring pigments are advantageously incorporated in the cover. In general, it is advisable to use more balata than chloroprene polymer and preferably about three times as much. By adding somewhat more balata a harder composition is obtained. The composition may also be hardened by the addition of resins, rubber derivatives (such as chlorinated rubber, rubber hydrochloride), etc. By increasing the proportion of chloroprene polymer a somewhat softer cover is obtained. The composition may likewise be softened by the addition of a suitable plasticizer such as rubber, factice, oils, etc. By using more balata and a plasticizer, or less balata and a hardener one may obtain a composition of approximately the same hardness as three parts balata and one part of the chloroprene polymer.

The balata and the chloroprene polymer may be mixed on a cold rubber mill. It is desirable to use basic materials such as magnesia and zinc oxide with the chloroprene polymer and a white pigment such as titanium oxide may be used to give the golf ball cover the desired color.

According to a preferred operation 2.5 parts of light calcined magnesia, 1.5 parts of zinc oxide and 10 parts of titanium oxide were milled into 25 parts of "Duprene". This was then milled into seventy-five parts of balata which had been broken down on a rubber mill.

Such a composition may be applied to a golf ball center by any of the usual processes. For example, it may be formed into cups and these cups may then be molded onto the golf ball center with heat and pressure. The resulting golf ball may be painted or otherwise treated as desired. The ball may be surface-treated with tin tetrachloride, bromine, chlorine, or the like, before painting.

I claim:

1. A tough, plastic, homogeneous composition of balata and a chloroprene polymer.
2. A tough, thermoplastic, homogeneous composition comprising about three parts of balata and one part of a chloroprene polymer.
3. A golf ball with a molded cover comprising a homogeneous mixture of balata and a chloroprene polymer.
4. A golf ball with a molded cover comprising a homogeneous mixture of balata and a chloroprene polymer in about the ratio of 3 to 1.
5. A golf ball with a molded cover comprising a homogeneous mixture of balata, a chloroprene polymer, magnesium oxide, zinc oxide and titanium oxide, the balata and polymer being present in about the ratio of 3 to 1.

JAMES A. MERRILL.